US009842090B2

(12) United States Patent
Idicula et al.

(10) Patent No.: US 9,842,090 B2
(45) Date of Patent: Dec. 12, 2017

(54) EFFICIENT STREAMING EVALUATION OF XPATHS ON BINARY-ENCODED XML SCHEMA-BASED DOCUMENTS

(75) Inventors: Sam Idicula, Mountain View, CA (US); Sivasankaran Chandrasekar, Menlo Park, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 657 days.

(21) Appl. No.: 11/950,642

(22) Filed: Dec. 5, 2007

(65) Prior Publication Data
US 2009/0150412 A1    Jun. 11, 2009

(51) Int. Cl.
*G06F 17/30*    (2006.01)
*G06F 7/00*    (2006.01)
(Continued)

(52) U.S. Cl.
CPC ...... *G06F 17/2247* (2013.01); *G06F 17/2252* (2013.01); *G06F 17/30442* (2013.01);
(Continued)

(58) Field of Classification Search
CPC ......... G06F 17/30442; G06F 17/30463; G06F 17/2247; G06F 17/30516; G06F 17/30938
(Continued)

(56) References Cited

U.S. PATENT DOCUMENTS 4,769,772 A    9/1988  Dwyer
5,295,261 A    3/1994  Simonetti
(Continued)

FOREIGN PATENT DOCUMENTS

EP    1 241589 A2    9/2002
WO    WO 00/49533 A2    8/2000
(Continued)

OTHER PUBLICATIONS

L. Fegaras, D. Levine, S. Bose, and V. Chaluvadi, "Query Processing of Streamed XML Data," Proc. 11th Int'l Conf. Information and Knowledge Management, Nov. 2002.*
(Continued)

*Primary Examiner* — Kannan Shanmugasundaram
(74) *Attorney, Agent, or Firm* — Hickman Palermo Becker Bingham LLP

(57) ABSTRACT

A database system may utilize XML schema information to increase the efficiency of an XPath streaming evaluation. The database system may access XML schema or translation information during the evaluation of an element, attribute, or value in an XML data source. Based on the XML schema or translation information, the database system may determine matches to an XPath expression without decoding any binary-encoded data in the XML data source. Also, based on the XML schema information, the database may selectively skip or evaluate portions of the XML data source depending on whether those portions are defined in the XML schema so as to possibly contain a match to one or more unmatched steps in the XPath expression. XML schema information may be compiled into a compiled representation of the XPath expression for additional efficiencies.

26 Claims, 6 Drawing Sheets

(51) Int. Cl.
*G06F 17/22* (2006.01)
*G06F 17/00* (2006.01)

(52) U.S. Cl.
CPC .. *G06F 17/30463* (2013.01); *G06F 17/30516* (2013.01); *G06F 17/30938* (2013.01)

(58) Field of Classification Search
USPC .................................. 707/718, 999.001–5
See application file for complete search history.

(56) References Cited

U.S. PATENT DOCUMENTS

| | | | |
|---|---|---|---|
| 5,404,513 A | 4/1995 | Powers et al. | |
| 5,467,471 A | 11/1995 | Bader | |
| 5,680,614 A | 10/1997 | Bakuya et al. | |
| 5,724,577 A | 3/1998 | Exley et al. | |
| 5,734,887 A | 3/1998 | Kingberg et al. | |
| 5,878,415 A | 3/1999 | Olds | |
| 5,974,407 A | 10/1999 | Sacks | |
| 5,987,506 A | 11/1999 | Carter et al. | |
| 6,003,040 A | 12/1999 | Mital et al. | |
| 6,018,747 A | 1/2000 | Burns et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,523,062 B1 | 2/2003 | Bridgman et al. | |
| 6,539,398 B1 | 3/2003 | Hannan et al. | |
| 6,571,231 B2 | 5/2003 | Sedlar | |
| 6,598,055 B1 | 7/2003 | Keesey et al. | |
| 6,604,100 B1 | 8/2003 | Fernandez et al. | |
| 6,609,121 B1 | 8/2003 | Ambrosini et al. | |
| 6,636,845 B2 | 10/2003 | Chau et al. | |
| 6,643,633 B2 | 11/2003 | Chau et al. | |
| 6,662,342 B1 | 12/2003 | Marcy | |
| 6,684,227 B2 | 1/2004 | Duxbury | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,883,137 B1 | 4/2005 | Girardot et al. | |
| 6,920,457 B2 | 7/2005 | Pressmar | |
| 6,964,025 B2 | 11/2005 | Angiulo et al. | |
| 7,013,425 B2 | 3/2006 | Kataoka | |
| 7,031,956 B1 | 4/2006 | Lee et al. | |
| 7,043,488 B1 | 5/2006 | Bauer et al. | |
| 7,080,094 B2 | 7/2006 | Dapp et al. | |
| 7,089,239 B1 | 8/2006 | Baer et al. | |
| 7,089,567 B2 | 8/2006 | Girardot et al. | |
| 7,139,746 B2 | 11/2006 | Shin et al. | |
| 7,143,397 B2 | 11/2006 | Imaura | |
| 7,162,485 B2 | 1/2007 | Gottlob et al. | |
| 7,174,354 B2 | 2/2007 | Andreasson | |
| 7,523,119 B2 | 4/2009 | Imamura et al. | |
| 7,596,548 B2 | 9/2009 | Josifovski et al. | |
| 7,707,005 B2 | 4/2010 | Fraser et al. | |
| 7,788,654 B2 | 8/2010 | Kostoulas et al. | |
| 7,831,903 B2 | 11/2010 | Heuer et al. | |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0172135 A1 | 9/2003 | Bobick et al. | |
| 2003/0182142 A1 | 9/2003 | Valenzuela et al. | |
| 2003/0182624 A1 | 9/2003 | Large | |
| 2003/0212662 A1 | 11/2003 | Shin et al. | |
| 2003/0212664 A1 | 11/2003 | Breining et al. | |
| 2004/0010752 A1 | 1/2004 | Chan et al. | |
| 2004/0043758 A1 | 3/2004 | Sorvari et al. | |
| 2004/0064466 A1 | 4/2004 | Manikutty et al. | |
| 2004/0088320 A1 | 5/2004 | Perry | |
| 2004/0143791 A1 | 7/2004 | Ito et al. | |
| 2004/0148278 A1 | 7/2004 | Milo et al. | |
| 2004/0172599 A1* | 9/2004 | Calahan | 715/513 |
| 2004/0176958 A1 | 9/2004 | Salmenkaita et al. | |
| 2004/0186841 A1 | 9/2004 | Heuer et al. | |
| 2004/0205082 A1 | 10/2004 | Fontoura et al. | |
| 2004/0220912 A1 | 11/2004 | Manikutty et al. | |
| 2004/0221229 A1* | 11/2004 | Perry | 715/514 |
| 2004/0225680 A1 | 11/2004 | Cameron et al. | |
| 2004/0230667 A1 | 11/2004 | Wookey | |
| 2004/0260691 A1 | 12/2004 | Desai et al. | |
| 2004/0261019 A1* | 12/2004 | Imamura et al. | 715/513 |
| 2004/0267760 A1 | 12/2004 | Brundage et al. | |
| 2005/0033733 A1 | 2/2005 | Shadmon et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091188 A1 | 4/2005 | Pal et al. | |
| 2005/0097084 A1 | 5/2005 | Balmin et al. | |
| 2005/0144556 A1 | 6/2005 | Petersen et al. | |
| 2005/0177543 A1 | 8/2005 | Chen et al. | |
| 2005/0203957 A1* | 9/2005 | Wang et al. | 707/104.1 |
| 2005/0228792 A1 | 10/2005 | Chandrasekaran et al. | |
| 2005/0228818 A1 | 10/2005 | Murthy et al. | |
| 2005/0273772 A1* | 12/2005 | Matsakis | G06F 8/41 717/136 |
| 2005/0278289 A1 | 12/2005 | Gauweiler et al. | |
| 2005/0278616 A1 | 12/2005 | Eller | |
| 2005/0289125 A1 | 12/2005 | Liu et al. | |
| 2006/0005122 A1* | 1/2006 | Lemoine | 715/513 |
| 2006/0021246 A1 | 2/2006 | Schulze et al. | |
| 2006/0036631 A1* | 2/2006 | Cheslow | 707/101 |
| 2006/0069985 A1 | 3/2006 | Friedman et al. | |
| 2006/0129584 A1 | 6/2006 | Hoang et al. | |
| 2006/0136761 A1 | 6/2006 | Frasier et al. | |
| 2006/0212467 A1 | 9/2006 | Murthy et al. | |
| 2007/0043702 A1* | 2/2007 | Lakshminarayanan et al. | 707/3 |
| 2007/0050704 A1 | 3/2007 | Liu | |
| 2007/0113221 A1 | 5/2007 | Liu et al. | |
| 2007/0208752 A1* | 9/2007 | Khaladkar | G06F 17/2217 |
| 2007/0260571 A1* | 11/2007 | Mansfield et al. | 706/48 |
| 2008/0028374 A1 | 1/2008 | Matsa et al. | |
| 2008/0028375 A1 | 1/2008 | Matsa et al. | |
| 2008/0082484 A1 | 4/2008 | Averbuch et al. | |
| 2008/0098001 A1 | 4/2008 | Gupta et al. | |

(56) References Cited

U.S. PATENT DOCUMENTS

| | | |
|---|---|---|
| 2008/0098019 A1 | 4/2008 | Sthanikam et al. |
| 2008/0098020 A1 | 4/2008 | Gupta et al. |
| 2008/0120351 A1 | 5/2008 | Khaladkar et al. |
| 2009/0112890 A1 | 4/2009 | Medi et al. |
| 2009/0125495 A1 | 5/2009 | Zhang et al. |
| 2009/0125693 A1 | 5/2009 | Idicula et al. |
| 2009/0327252 A1 | 12/2009 | Zhang et al. |

FOREIGN PATENT DOCUMENTS

| | | |
|---|---|---|
| WO | WO 01/59602 A1 | 8/2001 |
| WO | WO 01/61566 A1 | 8/2001 |
| WO | WO 03107576 A2 | 12/2003 |
| WO | WO 2006026534 A2 | 3/2006 |

OTHER PUBLICATIONS

R. J. Bayardo, D. Gruhl, V. Josifovski, and J. Myllymaki, "An Evaluation of Binary Encoding Optimizations for Fast Stream Based XML Processing," Proceedings of the 13th International World Wide Web Conference, New York, NY (2004), pp. 345-354.*

L. Fegaras, D. Levine, S. Bose, and V. Chaluvadi, "Query Processing of Streamed XML Data," Proc. 11th Int'l Conf. Information and Knowledge Management, Nov. 2002.*

Zhang, et al., "TDX: A High Performance Table-driven XML Parser", In proceedings of the 44$^{th}$ annual (ACM) Southeast Regional Conference, Mar. 2006, ACM, 6 pages.

Balmin et al., "Incremental Validation of XML Documents", ACM Trans. Database System 24, Dec. 2004, 42 pages.

Peer to Patent, Third Party submission for PGPub 20090125495, "Optimized streaming evaluation of xml queries", Sep. 1, 2009.

Xiaogang Li, Agrawal, "Efficient Evaluation of XQuery over Streaming Data", 2005, 31$^{st}$ VLDB Conference, pp. 265-276.

IBM Research, "XAOS: An Algorithm for Streaming XPath Processing with Forward and Backward Axes" 2003, pp. 1-2.

Bayardo et al., "An Evaluation of Binary XML Encoding Optimizations for Fast Stream Based XML Processing" *WWW2004* 10 pages.

"Binary XML Library" downloaded from the Internet Aug. 6, 2007 <http://smos.esa.int/BinaryXML/> 2 pages.

Bruce, "CubeWerx Position Paper for Binary XML Encoding" (10 pages).

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender," IEEE, ICDE '00 Conference, San Diego, Feb. 2000, 128 pages.

"EE XML/Binary CFI File Handling Library User Manual" downloaded from the Internet <http://www.smos.esa.int/BinaryXML/SO-UM-DME-LIPP-0005-BINXML-FH-SUM-E2-RO.pdf> 49 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Liu et al., "XML retrieval: Configurable indexing and ranking for XML information retrieval", Jul. 2004, Proceedings of the 27th annual international ACM SIGIR conference on Research and development in information retrieval SIGIR 04, Pulished by ACM press, 12 pages.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Martin et al., "WAP Binary XML Content Format" downloaded from the Internet Aug. 6, 2007 < http://www.w3.org/TR/wbxml1 > 15 pages.

Min et al., "XML Indexing and compression: XPRESS: a queriable compression for XML data", Jun. 2003, Proceedings of the 2003 ACM SIGMOD international conference on Management of data SIGMOD 03, Published by ACM Press, 8 pages.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle XML DB Developer's Guide 11gR1, Oct. 2007, http://download.oracle.com/docs/cd/B28359_01/appdev.111/b28369.pdf.

PCT/US2007/010163, Notification of Transmittal of the International Search Report and the Written Opinion of the International Searching Authority, dated Oct. 12, 2007, 12 pages.

Peng, Feng et al., "XPath queries on streaming data" (2003) *ACM Press*, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

"Zapthink" downloaded from the Internet Aug. 6, 2007 < http://www.zapthink.com/report.html?id=ZAPFLASH-11162004 > 3 pages.

Zisman et al., "Using XML to Build Consistency Rules for Distributed Specifications," Proceedings of the Tenth International Workshop on Software Specification and Design (IWSD'00), IEEE 2000, 8 pages.

Zou et al., "XML Processing: Ctree: a compact tree for indexing XML data" Nov. 2004, Proceedings of the 6th annual international workshop on Web information and data management WIDM 04, Published by ACM Press, 10 pages.

Balmin et al., "Cost-based Optimization in DB2 XML," 2006, IBM System Journal, IBM, vol. 45 No. 2, pp. 299-319.

Beyer et al., "System RX: One Part Relational, One Part XML," Jun. 14-16, 2005, SIGMOD, pp. 347-358.

Josifovski et al., "Querying XML Streams," Apr. 8, 2004, VLDB Journal, pp. 1-14.

Zhang et al., Statistical Learning Techniques for Costing XML Queries, 2005, Proceedings of the 31$^{st}$ VLDB conference, pp. 289-300.

U.S. Appl. No. 11/938,017, filed Nov. 9, 2007, Notice of Allowance, dated Aug. 19, 2010.

U.S. Appl. No. 11/729,943, filed Mar. 28, 2007, Final Office Action, dated Sep. 29, 2010.

W3C, XML Schema Part 0: Primer, W3C Recommendation, dated May 2, 2001, Editor: David C. Fallside, Copyright 2001, 54 pages.

* cited by examiner

EFFICIENT STREAMING EVALUATION OF XPATHS ON BINARY-ENCODED XML SCHEMA-BASED DOCUMENTS

CROSS-REFERENCE TO RELATED APPLICATIONS

This application is related to U.S. patent application Ser. No. 11/716,505, filed Mar. 8, 2007, entitled "Technique To Estimate The Cost Of Streaming Evaluation Of XPaths," by Idicula et al; and U.S. patent application Ser. No. 11/743,563, filed May 2, 2007, entitled "TECHNIQUES FOR EFFICIENT LOADING OF BINARY-ENCODED XML DATA," by Gupta et al. The entire contents of the aforementioned references are hereby incorporated by reference for all purposes as if fully set forth herein.

FIELD OF THE INVENTION

Embodiments of the invention described herein relate generally to processing XML data, and, more specifically, to techniques for efficiently performing a streaming evaluation of an XPath expression on XML data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

XML

Database systems often store within their databases XML-formatted data. This data may come from a variety of sources, though the source is often an XML document or a database object.

In XML, data items known as elements are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant element. Collectively, an element along with its attributes and descendants, are often referred to as a tree or a subtree.

XML Schema

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 October 2004, the entire contents of which are hereby incorporated by reference for all purposes as if fully set forth herein. The second document in the set is "XML Schema Part 1: Structures Second Edition", W3C Recommendation 28 October 2004, the entire contents of which are hereby incorporated by reference for all purposes as if fully set forth herein. The third document in the set is "XML Schema Part 2: Datatypes Second Edition", W3C Recommendation 28 October 2004, the entire contents of which are hereby incorporated by reference for all purposes as if fully set forth herein.

As referred to herein, an XML schema is a defined structure for XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

Binary-Encoded XML

Binary-encoded XML is one format in which XML data may be stored in a database. Binary-encoded XML is taught, for example, in "TECHNIQUES FOR EFFICIENT LOADING OF BINARY XML DATA," incorporated above. Binary-encoded XML is a compact binary representation of XML that was designed to reduce the size of XML documents. One of the ways binary-encoded XML compresses data is by representing strings ("tokens") with fixed values.

In one implementation of binary-encoded xml, a mapping is established between character strings and replacement values, where the character strings are tag names, and the replacement values are numbers. Such mappings are referred to herein as "translation information".

For example, consider an XML document PO1 that contains the following content:

```
<PurchaseOrder>
    <item>
        Important Data
    </item>
</PurchaseOrder>
```

PO1 includes the tokens PurchaseOrder and item. To store PO1 in binary-encoded xml format, the token PurchaseOrder may be mapped to 1, and the token item may be mapped to 2. Typically, the replacement values consume much less space than the corresponding tokens. For example, the token PurchaseOrder, which contains fourteen characters, may be assigned a binary replacement value that takes less space to store than a single text character.

Once translation information has been created, XML documents may be stored in binary-encoded xml based on the translation information. For example, PO1 may be stored as <1><2>Important Data</2></1>. In typical implementations of binary-encoded xml, even the symbols (e.g. "<", ">", and "/") may be represented by binary replacement values.

Translating Between Binary-Encoded XML and Text

When stored in binary-encoded xml, an XML document consumes much less space than is required by other formats of XML storage. However, the space savings is achieved at the cost of additional overhead required to convert textual XML to binary-encoded xml, and to convert binary-encoded xml to textual XML. For example, to be meaningful to an application that requests PO1, <1><2>Important Data</2></1> would have to be translated back into:

```
<PurchaseOrder>
    <item>
        Important Data
    </item>
</PurchaseOrder>
```

In order to reconstruct the text of an XML document that has been stored in binary format, the translation information that was used to encode the XML document must be available. The translation information that is used to store XML data within a database are typically stored separate from the binary-encoded XML data itself.

Translation Information

How database system stores translation information may hinge on whether the translation information is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema, and (b) XML documents that conform to an XML schema, but the XML schema is not known to the database server.

In some database systems, the translation information for known-schema binary-encoded XML is stored on a per-schema basis. Thus, since all documents that conform to a given schema will typically contain the same tag strings, the same translation information is used to encode all of the documents that conform to the given schema.

In some database systems, the translation information for known-schema binary-encoded XML is stored in a database as part of the definition of the schema. Schema definitions, in turn, are stored in a schema table.

In some database systems, translation information may not be required for known-schema binary-encoded XML. In such database systems, the algorithm for translating between binary-encoded XML and non-binary-encoded XML is well known, so that any component with access to an XML schema may determine a translation based solely on the XML schema.

For example, the following XML schema, hereinafter known as POSchema1 may have been used to encode PO1 above:

```
<?xml version="1.0" encoding="utf-8"?>
<xs:schema xmlns:xs="http://www.w3.org/2001/XMLSchema">
<xs:element name="PurchaseOrder">
    <xs:complexType>
        <xs:sequence>
            <xs:element name="item" type="xs:int" maxOccurs="2" />
        </xs:sequence>
    </xs:complexType>
```

-continued

```
</xs:element>
</xs:schema>
```

Because PurchaseOrder is the first element listed in the schema, it may have been encoded as the number 1. Likewise, since item is the second element in the schema, it may have been encoded as the number 2. Other elements may be encoded using this same algorithm. An XML decoder may decode any document that follows this schema just by examining POSchema1 and being aware of this encoding algorithm.

In some database systems, the translation information for all unknown-schema binary-encoded xml is stored in tables referred to herein as "token tables". In one embodiment, three token tables are used to store the translation information for unknown-schema XML: a Qname token table, a namespace token table, and a path_id token table. The three token tables are collectively referred to as a "token table set".

The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

XML Query and XPath

It is important for object-relational database systems that store XML data to be able to execute queries using XML query languages. XML Query Language (XQuery) and XML Path Language (XPath) are important standards for a query language, which can be used in conjunction with SQL to express a large variety of useful queries. XPath is described in XML Path Language (XPath), version 1.0 (W3C Recommendation 16 November 1999), herein incorporated by reference, as well as in XML Path Language (XPath) 2.0 (W3C Recommendation 23 January 2007), herein incorporated by reference. XQuery is described in XQuery 1.0: An XML Query Language (W3C Recommendation23 January 2007), herein incorporated by reference.

Streaming XPath Evaluation with Binary-Encoded XML

Some techniques for evaluating XML queries rely on normalizing an XML query to form a set of simple XPath expressions. The XPath expressions are then evaluated against a streamed XML data source using techniques that may be collectively referred to as streaming evaluations. Streaming evaluation techniques typically rely on an XPath evaluator built in to the database system where the XML data is stored. One streaming evaluation technique is discussed in "Technique To Estimate The Cost Of Streaming Evaluation Of XPaths," incorporated above.

In a streaming evaluation, an XPath evaluator first parses an XML input stream comprising one or more XML data sources against which the XPath expression is to be run. It may parse the XML input stream with, for example, an XML Parser provided by the database system or internal to the XML evaluator. The XPath evaluator then evaluates the parsed XML data against the set of XPath expressions.

Typically, this process involves evaluating each element, attribute, or value in the parsed XML data against a compiled representation of the set of XPath expressions. For example, the XML evaluator or XML parser may generate XML events for each and every element or attribute it finds in the parsed XML data. The XML evaluator may then evaluate these events, one-by-one, with the compiled XPath representation. For each event, the XML evaluator uses the compiled XPath representation to determine whether the event matches a next unmatched step (i.e. constraint) in each XPath expression. When the compiled XPath representation indicates that all steps in an XPath expression have been matched, it generates an XPath result.

A state machine, such as a non-finite automaton (NFA), is an example compiled XPath representation. The states and state transitions of the state machine may reflect each constraint in one or more XPath expressions. Based on the parsed XML data, the XPath evaluator transitions the state machine between its various states. When the state machine is in an accepting state, XPath evaluator generates an XPath result.

When an XML input stream is binary-encoded, an XPath evaluator must decode the binary-encoded XML. Decoding is necessary for several reasons. First, the steps in each XPath expressions are based non-encoded element and attribute names. To evaluate XML data against an XPath expression, the XML data must also be non-encoded. Second, the XPath evaluator must output an XPath result with non-encoded XML.

Therefore, the XML evaluator decodes the binary-encoded XML before evaluating the XML data with the compiled XPath representation. Typically, the XML evaluator decodes the XML data by means of a standard XML decoder component provided by the database system. The XML decoder component is typically integrated into the XML parser, especially when the XML parser is a system-provided component used for a variety of other purposes.

It is desirable to optimize streaming evaluation techniques in order provide more efficient evaluation of XPath expressions in a database system. Increased efficiency may allow for faster streaming evaluations, less demand on computer resources during streaming evaluation, or both.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
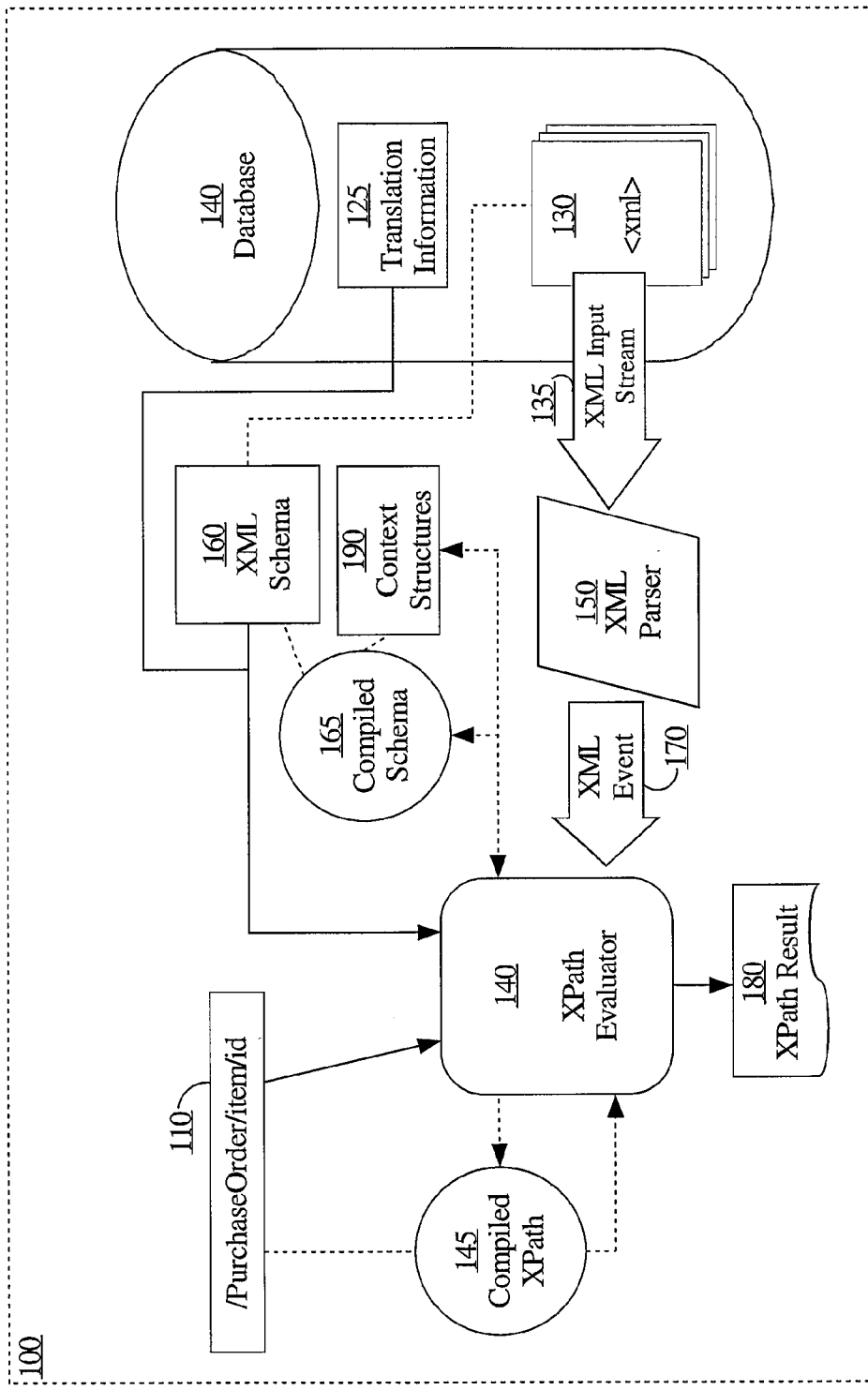
FIG. 1 is a block diagram that illustrates a database system upon which may be practiced techniques for utilizing XML schema or translation information during a streaming evaluation of an XPath expression according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for utilizing XML schema and translation information to increase the efficiency of an XPath streaming evaluation. According to an embodiment, a database system may access XML schema or translation information during the evaluation of an element, attribute, or value in an XML data source. Based on the XML schema or translation information, the database system may determine matches to an XPath expression without decoding any binary-encoded data in the XML data source. Also, based on the XML schema information, the database system may selectively skip or evaluate portions of the XML data source depending on whether those portions are defined so as to possibly contain a match to one or more unmatched steps in the XPath expression. This XML schema information may be compiled into a compiled representation of the XPath expression for additional efficiencies.

According to an embodiment, an XPath evaluator evaluates an XPath expression against one or more binary-encoded XML data sources. During compilation of the XPath expression, each step of the XPath expression may be encoded using the same encoding scheme as was used to encode the one or more binary-encoded XML data sources. For example, each step of the XPath expression may be encoded based on matching element or attribute names in an XML Schema or in database translation information. Thus, the compiled XPath representation may comprise encoded XPath steps that may be evaluated directly against encoded XML data. To take advantage of this capability, a binary-encoded XML data source may be parsed without first decoding its XML data. For example, an XML parser may be configured to stream events from the XML data source that are binary-encoded as opposed to textual. Upon the XPath evaluator finding a match to an XPath expression, only the matching XML data need be decoded.

This embodiment may be more efficient in that it may save processing time that would otherwise be spent decoding non-matching binary-encoded XML data. This embodiment may also increase efficiency by reducing the resources necessary to compare XML data to the steps of the XPath expression, since binary-encoded XML data is typically more compact and easier to compare than non-encoded XML.

According to an embodiment, an XPath evaluator may utilize information from an XML schema to skip non-matching portions of XML data during evaluation of an XPath expression against a streamed XML data source defined by that XML schema. During the streaming evaluation, based at least on information derived from the XML schema, the XPath evaluator identifies a next portion of unevaluated XML data in the streamed XML data source that cannot possibly contain an element, attribute, or value that matches an unmatched step in the XPath expression. The XPath evaluator may skip evaluation of this next portion of unevaluated XML data. Identification of such a "non-matching" portion of the streamed XML data is possible because the XML schema defines the order in which elements, attributes, and values can occur in the streamed XML data source. So, for example, if a next unmatched step requires a child element named "item," but the XML schema does not define a child element named item, the entire subtree of the current element may be deemed non-matching, meaning that it may be skipped. The information from the schema may be compiled with a compiled representation of the XPath expression, or it may be accessed during execution of an XPath expression.

According to an embodiment, during evaluation of an XPath expression against a streamed XML data source defined by an XML schema, an XPath evaluator utilizes information from an XML schema to jump directly to the location of a next potentially matching element, attribute, or value in the streamed XML data source. Based at least on information derived from the XML schema, the XPath evaluator identifies a target location in the XML data stream for an unevaluated element, attribute, or value that potentially matches a next unmatched step in the XPath expression. The location may be identified based on, for example, a comparison of an unmatched step in the XPath expression to sequence or occurrence constraints in the XML schema. The XPath evaluator may also base this identification on a determination that no other potential matches may occur in any unevaluated element, attribute, or value that may be parsed prior to the target location. The XPath evaluator may then skip evaluation of any unevaluated elements, attributes, or values in the XML data stream that occur before the target location.

According to an embodiment, XML schema or translation information may be accessible to the XPath evaluator by means of a compiled schema representation, which representation may be traversed in lock-step with an XML data source. The compiled schema representation may be included in a compiled XPath representation, so that relevant schema constraints are visible at each step in the compiled XPath representation. Alternatively, the XML evaluator may maintain the compiled schema representation separately. According to an embodiment, various data structures may also be maintained during traversal of the compiled schema representation to help keep track of the current schema-based context of the XML data source. According to an embodiment, XML schema information may be taken into consideration during compilation of an XPath expression to rule out the possibility of some matches, and to consolidate steps for other matches.

2.0. Structural Overview

FIG. 1 is a block diagram that illustrates a database system 100 upon which may be practiced techniques for utilizing XML schema or translation information during a streaming evaluation of an XPath expression, according to an embodiment of the invention.

Database system 100 may evaluate XPath expression 110. XPath expression 110 may be any type of XPath expression. XPath expression 110 may be designed to produce one or more XPath result sets, comprising elements, attributes, values, or any combination thereof, from a collection of XML data. XPath expression 110 may comprise several constraints, each of which indicate a characteristic of an element, attribute, or value to be returned in the result set, or of an ancestor or descendant of that element, attribute, or value. These constraints may be referred to as "steps," in that one constraint must typically be met before the next constraint can be evaluated. For example, the steps depicted in XPath expression 110 are, in order: PurchaseOrder (an element), item (a child element of any qualifying PurchaseOrder element), and text( ) (the data value inside of any qualifying item element). XPath expression 110 may include other types of steps, such as predicates.

Database system 100 may evaluate XPath expression 110 for one of any number of reasons. For example, a client may have submitted XPath expression 110 as part of an XQuery. As another example, a client may have submitted a more complex XQuery statement that database system 100 normalized (i.e. simplified) into XPath expression 110. As another example, database system 100 may need to evaluate XPath expression 110 to complete another operation internal to database system 100.

Database system 100 comprises a database 120 that stores XML data. Database system 100 will evaluate XPath expression 110 against data in database 120. More specifically, database system 100 will evaluate XPath expression 110 against XML data collection 130, which is a subset of the XML data stored in database 120. XML data collection 130 may comprise all XML data sources in database 120. Alternatively, XML data collection 130 may comprise a subset of XML data sources in database 120. For example, data collection 130 may comprise those data sources that are implicated either explicitly or contextually by an XQuery statement from which XPath expression 110 originated. Data collection 130 also may span multiple databases, or may reside in files on disk instead of in database 120.

Each XML data source in data collection 130 may be based upon an XML schema 160. XML schema 160 may be stored in database 120, or may be stored in any other location accessible to database system 100. However, some of the techniques described herein may be still be applicable when data collection 130 comprises XML data sources that are not based on XML schema 160 (or, in some cases, any other XML schema).

Data collection 130 may or may not be binary-encoded. If data collection 130 is binary-encoded, the binary encoding may be based upon translation information 125. Translation information 125 may be stored in database 120, or may be stored in any other location accessible to database system 100. Alternatively, the binary encoding may also be based upon XML schema 160. Alternatively, the binary encoding may be based on both XML schema 160 and translation information 125.

Database system 100 comprises an XPath evaluator 140. XPath evaluator 140 is a component of database system 100 designed to evaluate XPath expressions, such as XPath expression 110, against one or more XML data sources, such as data collection 130, to produce an XPath result, such as XPath result 180.

XPath evaluator 140 may utilize an XML parser 150 to parse XML data from data collection 130. XML parser 150 accesses data collection 130 via XML input stream 135. XML parser 150 may or may not also function as an XML decoder—that is, comprise code capable of decoding XML data from data collection 130. XML parser 150 may be a system component provided by database system 100. Alternatively, XPath evaluator 140 may comprise code capable of parsing XML data directly from XML input stream 135.

XML parser 150 may communicate an element, attribute, or value in XML input stream 135 to XPath evaluator 140 in the form of an XML event 170. According to an embodiment, XML event 170 is a standard Simple API for XML (XML SAX) event. Each element in the inputted XML data may, for instance, trigger a beginning and an ending event, corresponding to the opening tag and the closing tag of that element, respectively. Alternatively, XML parser 150 may generate any other type of event, so long as XPath evaluator 140 is capable of interpreting the generated event.

To assist in evaluating XPath expression 110, XPath evaluator 140 may generate a compiled XPath representation 145 of XPath expression 110. Compiled XPath representation 145 is an efficient memory representation of XPath expression 110 that allows XPath evaluator 140 to execute XPath expression 110 more quickly than XPath evaluator 140 would be able to evaluate XPath expression 110 by itself. Compiled XPath representation 145 may be, for example, a state machine, wherein the steps of XPath expression 110 are represented as states and state transitions. However, XPath evaluator 140 need not necessarily rely upon a compiled XPath representation.

According to an embodiment, XPath evaluator 140 may also utilize a compiled schema representation 165 to assist in evaluation of XPath expression 110 or compilation of compiled XPath representation 145. Compiled schema representation 165 is an efficient memory representation of XPath expression 110 that allows XPath evaluator 140 to traverse the structure of XML schema 160 more quickly than XPath evaluator 140 would be able to traverse XML schema 160 by itself. Compiled schema representation 165 may be, for example, a tree or a state machine. XPath evaluator 140 may generate compiled schema representation 165, or it may utilize a compiled schema representation 165 previously compiled by database system 100. However, XPath evaluator 140 need not necessarily rely upon a compiled schema representation.

According to an embodiment, XPath evaluator 140 may also comprise context structures 190. XPath evaluator 140 may utilize context structures 190 to keep track of the schema-based context of an XML data source during its evaluation of XPath expression 110 or compilation of compiled XPath representation 145. Context structures 190 may comprise, for instance, a stack of schema definitions corresponding to previously evaluated ancestor elements, a hash table of child element and attributes for each schema definition, the number of occurrences of a currently evaluated element, and a pointer to a schema sequence or list of siblings for a currently evaluated element. Compiled schema representation 165 may maintain context structures 190 by itself, or XPath evaluator 140 may maintain context structures 190 separately.

It will be apparent from the functional overview below that certain features of FIG. 1 are not necessary to practice certain techniques described below. For example, techniques for skipping evaluation of XML data segments based on XML schema information may not require translation information 125, while evaluating encoded XML may not necessarily require XML schema 160 or context structures 190.

3.0. Functional Overview 3.1. Streaming XPath Evaluation

Database system 100 may implement a streaming evaluation of an XPath expression in a variety of ways. For instance, database system 100 may request for XPath evaluator 140 to evaluate XPath expression 110 against data collection 130. XPath evaluator may respond by compiling XPath expression 110 to form compiled XPath representation 145, or it may begin evaluating XPath expression 110 without compiled XPath expression 145.

At the request of XPath evaluator 140, database system 100 feeds data from data collection 130 as input to XML parser 150. For example, database system 100 may establish XML input stream 135, whereby characters or bytes from each data source in data collection 130 are fed one-by-one to XML parser 150. Alternatively, database system 100 may feed entire XML documents or objects to XML parser 150.

XML parser 150 parses XML data received over XML input stream 135 linearly. When XML parser 150 recognizes, for instance, an element, attribute, or value in the XML data, it communicates that element, attribute, or value to XPath evaluator 140 so that XPath evaluator 140 may evaluate the element, attribute, or value. For example, XML parser 150 may communicate an element, attribute, or value by generating XML event 170. However, this communication may take place via a variety of other means.

XPath evaluator 140 may evaluate the elements, attributes, and values of XPath expression 110 one-by-one. For each of these elements, attributes, or values, XPath evaluator 140 may attempt to match a next unmatched step in XPath expression 110. XPath evaluator 140 may employ one of many techniques to determine if an event or series of events matches a step in XPath expression 110. For example, if XPath evaluator 140 utilizes a compiled XPath expression 145 that is a state machine, XPath evaluator 140 may compare event 170 to state transitions that lead from the current state of the state machine.

If an evaluated element, attribute, or value matches a step in XPath expression 110, evaluation component 140 "remembers" that the step has been matched, and begins looking for an element, attribute, or value that matches the next unmatched step.

If XPath evaluator 140 reaches the end of an element that matched a previously matched step, XPath evaluator 140 may mark the previously matched step as unmatched, and return to searching for a match for the previously matched step.

If all steps in XPath expression 110 are matched, evaluation component 140 may generate XPath result 180 based on any elements, attributes, or values parsed while all the steps remain matched. Over the course of evaluation, XPath evaluator 140 may generate many XPath results 180.

3.2. Evaluating Encoded XML

According to an embodiment of the invention, database system 100 may facilitate a more efficient streaming evaluation of XPath expression 110 for a binary-encoded data collection 130 by evaluating the encoded XML directly instead of first decoding the XML through, for example, XML parser 150.

To achieve this efficiency, XPath evaluator 140 may encode the textual references of each step in XPath expression 110 when it compiles compiled XPath representation 145. XPath evaluator 145 may encode the textual references using the same translation information 125 or XML schema 160 as was used to encode data collection 130.

Consequently, compiled XPath representation 145 may comprise encoded steps as opposed to textual steps. For example, if data collection 130 had been based on the schema POSchema, described above in the "Background" section, compiled XPath representation 145 might represent XPath expression 110 ("/PurchaseOrder/item/text( )") as follows: "/1/2/text( )".

Compiled XPath representation 145 may encode XPath expression 110 in a variety of other ways, as long as the encoded representation is based upon the same mechanism (e.g., algorithm, translation information, or XML schema) as was used to encode data collection 130.

XPath evaluator 140 may then utilize the compiled XPath representation 145 to evaluate binary-encoded XML data from data collection 130 without first decoding the binary-encoded XML data. For example, XPath evaluator 140 may utilize an XML parser 150 that is specially configured to generate a binary-encoded XML event 170 as opposed to a decoded XML event 170. If XML parser 150 is a system component of database 100, XML parser 150 may be configured to provide either a binary-encoded XML event 170 or a decoded XML event 170, based upon configuration parameters or input from an initiating component (i.e. XPath evaluator 140).

For example, if XPath evaluator 140 were to begin evaluating the XML file PO1, described in the "Background" section above, it would first parse a beginning tag for a binary-encoded element "1". Since compiled XPath representation 145 comprises encoded steps, XPath evaluator 140 may evaluate this encoded element "1" directly against compiled XPath representation 145. Doing so, it determines that the encoded element is a match to the step "/1". XPath evaluator 140 may then parse the encoded element "2", which matches the next encoded step in compiled XPath representation 145. XPath evaluator 140 may then parse the text "Important Data," which matches the last step in compiled XPath representation 145. XPath evaluator may then return this text as XPath result 180, without ever having decoded any part of XML file PO1.

If the XML data to be returned as an XPath result comprises encoded XML data, compiled XPath evaluator 140 may be configured to decode the matching encoded XML data prior to generating XPath result 180. To do so, it may again rely upon XML schema 160, translation information 125, or both. Alternatively, database 100 may be configured to decode XPath result 180 prior to delivering XPath result 180 to a requesting client. Alternatively, a requesting client may be configured to receive an encoded XPath result 180.

3.3. Selectively Skipping or Evaluating Portions of Streamed XML Data Based on XML Schema Information According to an embodiment of the invention, database system 100 may facilitate a more efficient streaming evaluation of XPath expression 110 by, at certain steps of XPath expression 110, skipping evaluation of portions of XML data in data collection 130 based upon information derived from XML schema 160.

During evaluation of XPath expression 110, XPath evaluator 140 may be configured to identify a non-matching portion of XML data in XML input stream 135 based on information from XML schema 160. The non-matching portion is such that it cannot contain an element, attribute, or value that matches a particular unmatched step in XPath expression 110. The non-matching portion may be identified based on information from XML schema 160 because XML schema 160 defines one or more constraints on the elements, attributes, and values in the non-matching portion. These constraints include constraints on nomenclature (i.e. the name of an element or attribute), ordering (i.e. sequence constraints and occurrence constraints), and data values (including value typing and content restraints on the actual values that may be found).

By comparing the particular unmatched step to schema definitions for a particular portion of XML data, XPath evaluator 140 may readily determine whether the particular portion may contain a match to the unmatched step, without ever evaluating the XML data. In essence, XPath evaluator 140 attempts to match the unmatched step to schema definitions in XML schema 160. Instead of looking for literal matches, however, XPath evaluator 140 simply looks for potential matches—that is, it determines whether a value allowed under a definition could potentially match the unmatched step. When a particular portion is non-matching—i.e. there is no potential match in the corresponding schema definitions for the particular portion—XPath evaluator 140 may skip evaluation of that particular portion of the XML data.

For example, when XPath evaluator 140 evaluates a certain element, it may load the schema definition of that element or an ancestor element from XML schema 160 or compiled schema representation 165. XPath evaluator 140 may then compare a next unmatched step in XPath expression 110 to the schema definition. Based on the schema definition, XPath evaluator 140 may be able to determine that a next portion of the XML data received over XML input stream 135 cannot possibly match the next unmatched step. For instance, the next unmatched step may require a child element that is not defined under the schema definition corresponding to the certain element. XPath evaluator 140 would not need to evaluate XML data for any child element of the certain element, since, according to the XML schema, not child element of the certain element could possibly match the next unmatched step. Thus, XPath evaluator 140 may safely skip evaluation of the non-matching portion of XML data.

Using the same strategy of matching an unmatched step to schema definitions in XML schema 160, XPath evaluator 140 may also identify a target location for a next potentially matching element in XML input stream 135. XPath evaluator 140 may then jump directly to the next potentially matching element. For instance, the next unmatched step may be for a child element named address. XML schema 160 may define a child element named address as the third child element of a particular element that matched the most recently matched step. Based on this information, after XPath evaluator 140 evaluates the particular element, XPath evaluator 140 may jump directly to the third child element of the particular element, without evaluating any interceding elements.

XPath evaluator 140 may identify non-matching portions of (or potentially matching elements in) the XML data by analyzing sequence, occurrence, and value constraints on the subtree for the certain element, as well as the subtree for ancestor or sibling elements of the certain element. The exemplary process discussed in section 4.5 illustrates several such techniques for identifying non-matching portions of the XML data.

In certain cases, XPath evaluator 140 may determine that there are no more matches within an entire XML data source (i.e. the non-matching portion of XML data is the remainder of the XML data source). In such cases, XPath evaluator 140 may terminate evaluation of the XML data source.

Skipping Evaluation f Portions of XML Data

XPath evaluator 140 may "skip" evaluation of a portion of XML data using several means. First, where XPath evaluator 140 performs its own parsing, XPath evaluator 140 may simply skip parsing any XML data until it recognizes the end of the non-matching portion or the start of the matching portion. For example, XPath evaluator 140 may search through XML input stream 135 for a certain end tag corresponding to the end of the non-matching portion.

Alternatively, if the structure of the incoming XML data is defined so that the exact size in memory of the non-matching portion may be determined from XML schema 160, XPath evaluator 140 may simply skip over a number of characters or bytes of that exact size in XML input stream 135. For example, XML schema 160 may define each data value in the non-matching portion to be of a type with a fixed size, such as integer. Thus, the exact size in characters of the non-matching portion may be readily determined and skipped over.

Alternatively, XML input stream 135 may be configured to have pointers to each element in the input stream. XPath evaluator 140 may know from XML schema 160 exactly how many elements are in the non-matching portion. It may then skip over any pointers to elements in the non-matching portion and resume evaluation with the pointer for first element of XML input stream 135 that is not in the non-matching portion.

Second, where XPath evaluator 140 relies on an XML parser 150 to parse XML input stream 135, XPath evaluator 140 may simply ignore any events that do not signal the end of the non-matching portion. Alternatively, XPath evaluator 140 may send instructions to XML parser 150 identifying the location of the next potentially matching portion of XML data. It may identify this location, for instance, by identifying a start tag for the next matching portion, an end tag for the non-matching portion, the index of the next matching child or sibling, a number of elements to skip, or the exact location in memory of the start of the next matching portion. XML parser 150 may then skip directly to the identified location using, for example, the same techniques as discussed for XPath evaluator 140 in the previous paragraphs.

According to an embodiment, the above techniques may also be used to jump to a target location in XML input stream 135 when XPath evaluator 140 identifies a target location for a potentially matching element as opposed to a non-matching portion of XML data. XPath evaluator 140 or XML parser 150 may adapt these techniques for jumping to a target location by treating all unevaluated XML data prior to the target location as a non-matching portion.

Utilizing Context Structures and Compiled Schema Representations

According to an embodiment, Xpath evaluator 140 may utilize context structures 190 to assist in identifying non-matching portions of XML data. For instance, XPath evaluator 140 may access context structures 190 to look up information about previously evaluated elements. This information may allow XPath evaluator 140 to, for example, quickly locate relevant schema definitions or determine whether the currently evaluated element has a child or sibling that matches the next unmatched step. This information also may help XPath evaluator 140 quickly determine whether, because of the occurrence of previously evaluated elements, occurrence, sequence, or value restraints rule out the possibility of a match to a next unmatched step in a next portion of the XML data.

According to an embodiment, XPath evaluator 140 may more efficiently utilize schema information from XML schema 160 by traversing compiled schema representation 165 in lock-step with compiled XPath expression 145. For example, each time XML evaluator 140 evaluates an element, attribute, or value, in addition to searching for a matching step using compiled XPath expression 145, XML evaluator 140 may traverse compiled schema representation 165 to locate and load a corresponding schema definition.

According to an embodiment, XPath evaluator 140 may also integrate compiled schema representation 165 into compiled XPath expression 145. For example, for each step of XPath expression 110, XPath expression 145 may include a compiled representation of the various schema definitions in XML schema 160 that correspond to the step. Furthermore, XPath evaluator 140 may utilize the schema definitions to optimize the compiled XPath representation 110, as discussed in section 4.5.

4.0. Implementation Examples 4.1. Process Flow For Evaluating Encoded Xml Data

Figure 2:
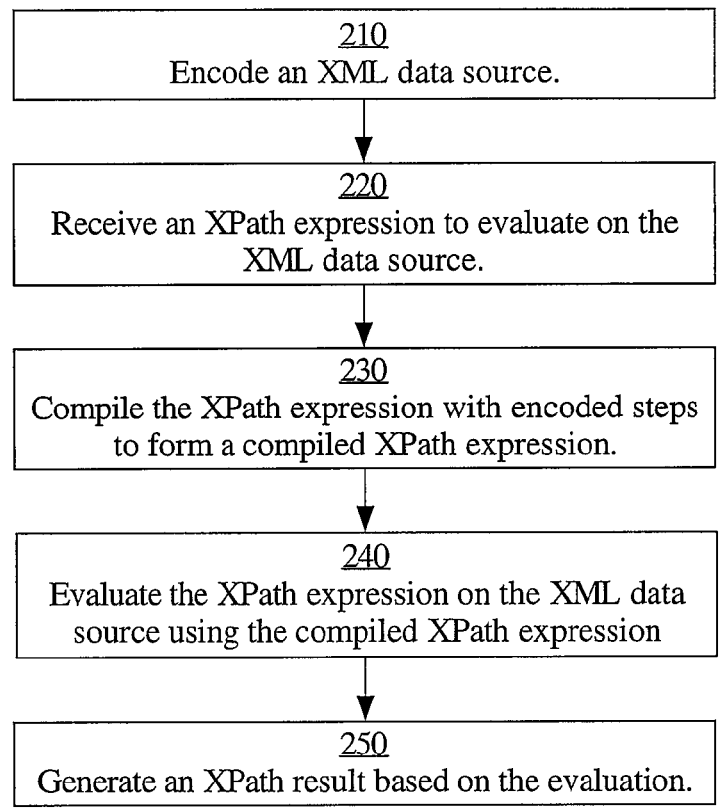
FIG. 2 depicts a flow diagram illustrating a technique for performing a streaming evaluation of an XPath expression on a binary-encoded XML data source, according to an embodiment of the invention.

FIG. 2 depicts a flow diagram 200 illustrating a technique for performing a streaming evaluation of an XPath expression on a binary-encoded XML data source, according to an embodiment of the invention.

In step 210, a database system, such as database system 100, encodes an XML data source. The database system encodes the XML data source using an algorithm based on an XML schema defining the XML data source, translation information stored within a database of the database system, or both an XML schema and translation information. During the process of encoding, the database system translates textual representations of elements and attributes in the XML data source into encoded representations, such as integers. The translation is predictable, in that the encoded representations for like-named elements are always the same. For example, the database system may use an algorithm that always translates any element named "item" to 2, regardless of the element's location in the XML data source.

The process of encoding the XML data source produces a binary-encoded XML data source, which is stored in a database or other location accessible to the database system. Alternatively, the database system may already store within one of its databases or otherwise have access to a binary-encoded XML data source.

In step 220, the database system receives an XPath expression to be evaluated on the binary-encoded XML data source. The XPath expression comprises textual representations of elements and attributes in the XML data source, such as in XPath expression 110.

In step 230, the database system compiles the XPath expression into a compiled representation, such as compiled XPath representation 145. The compiled representation may be, for instance, a state machine. The step of compiling comprises encoding the textual representations inside of the XPath expression into encoded representations. The database system encodes the textual representations using the same algorithm as used for the XML data source in step 210. Thus, the compiled representation comprises encoded representations of elements and attributes in the XML data source.

In step 240, the database system evaluates the XPath expression on the binary-encoded XML data source, without decoding the encoded representations within the binary-encoded XML data source. It does so by parsing, one-by-one, elements, attributes, and values from the XML data source. For each element, attribute, or value, the database system utilizes the compiled representation to determine if the element, attribute, or value matches a next unmatched step in the XPath expression.

Because the compiled representation of the XPath expression comprises encoded representations, and because these encoded representations were generated using the same algorithm as for the binary-encoded XML data source, the database system does not need to decode encoded elements and attributes to determine if an element or attribute matches an unmatched step. Rather, the database system will be able match encoded elements and attributes directly to the encoded representations within the compiled XPath expression.

In step 250, the database system generates an XPath result based upon the evaluation of step 240. It may do so, for example, as a result of parsing an element, attribute, or value while all of the steps of the XPath expression are matched. The database system may need to decode the XPath result, since no decoding is done during the evaluation.

The database system may utilize various components of FIG. 1 to accomplish the above steps. For example, an XPath evaluator, such as XPath evaluator 140, may perform some or all of steps 230-250 together with an XML parser, such as XML parser 150, in the manner discussed in section 3.2 above.

Figure 3:
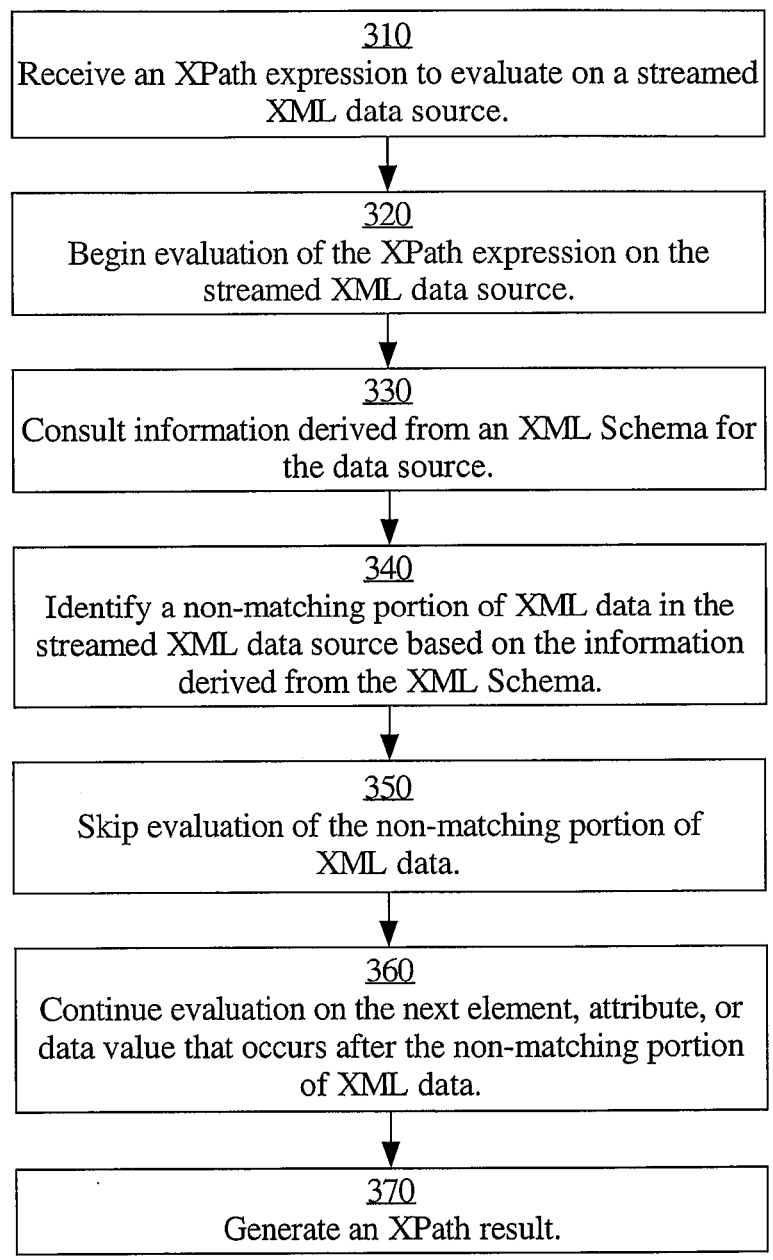
FIG. 3 depicts a flow diagram illustrating a technique for utilizing XML schema information to skip non-matching portions of XML data during a streaming evaluation of an XPath expression, according to an embodiment of the invention.

4.2. Process Flow for Skipping Evaluation of a Non-Matching Portion of Streamed XML Data Based on XML Schema Information FIG. 3 depicts a flow diagram 300 illustrating a technique for utilizing XML schema information to skip non-matching portions of XML data during a streaming evaluation of an XPath expression, according to an embodiment of the invention.

In step 310, a database system, such as database system 100, receives an XPath expression, such as XPath expression 110, to be evaluated with respect to a streamed XML data source, such as an XML document in data collection 130 via XML input stream 135.

In step 320, the database system begins evaluation of the XPath expression. During this evaluation, the database system may parse elements, attributes, and data values one-by-one from the streamed XML data source. When it parses an element, attribute, or data value, the database system may evaluate the element, attribute, or data value to determine if the element, attribute, or data value matches an unmatched step in the XPath expression. The database system may utilize state information or context structures to keep track of matched steps and elements. When all steps are matched, the database system may generate an XPath result based on the parsed XML data.

In step 330, while evaluating a step in the XPath expression, the database system consults information derived from an XML schema that defines the streamed XML data source, such as XML schema 160. The information consulted may include the XML schema itself, a compiled representation of the XML schema, such as compiled schema representation 165, or information coded into a compiled representation of the XPath expression. The information may be associated with the currently evaluated step or a next unmatched step. For example, the compiled representation of the XPath expression may comprise pre-determined information at each step that is based on the XML schema, as discussed in section 4.4.

In step 340, the database system identifies a non-matching portion of XML data in the streamed XML data source based on the information consulted in step 330. This identification of a non-matching portion of XML data may be accomplished in several ways.

For instance, the database system may load schema definitions for one or more matched elements (e.g. the last element that matched a step, or one of its ancestor elements). It may then compare one or more unmatched steps to definitions in the subtrees of the loaded schema definitions. The database system may utilize context information, such as context structures 190, to specifically exclude comparisons against definitions that only define XML data that has already been evaluated from the streamed XML data source. If a particular subtree does not comprise definitions capable of defining a yet-to-be-evaluated element or elements that match the unmatched steps, the database system may determine that any XML data corresponding to the particular subtree definitions must necessarily be non-matching. Techniques for comparing a step of an XPath expression to the XML schema to identify a non-matching portion of XML data are discussed in section 4.5 below.

Also, the information derived from the XML schema may more directly indicate a non-matching portion. For example, the database system may have already compiled information derived from the XML schema directly into a compiled representation of the XPath expression. During compilation, the database system may have pre-determined a non-matching portion using much the same strategy as discussed in the previous paragraph. This pre-determined information may have been included with, for instance, the currently evaluated step in the compiled XPath representation. Thus, the information consulted in step 330 may identify the non-matching portion with specific instructions that direct the database system to, in essence "skip the next n subelements," "skip the next n characters in the XML input stream," "terminate evaluation," and so on.

In step 350, the database system skips evaluation of the non-matching portion of XML data in the streamed XML data. As discussed under "Skipping Evaluation of Portions of XML Data" in section 3.3, this may entail ignoring events generated from the non-matching portion of XML data, or this may entail not parsing the non-matching portion of XML data from the streamed XML data source.

In step 360, the database system continues by evaluating the next element, attribute, or data value that occurs after the non-matching portion of XML data. However, if the non-matching portion is the remainder of the streamed XML data source, the database system may skip directly to step 370, after which it may terminate evaluation of the XPath expression on the streamed XML data source.

In step 370, the database system generates an XPath result based on the evaluation in steps 320-360.

The various steps of the evaluation of the streamed XML data source may be repeated any number of times, and not necessarily in the same order. For instance, steps 330-350 may be repeated after steps 360 or 370. Likewise, various steps in the process flow may be omitted depending on the nature of the streamed XML data source or the XML schema.

The database system may utilize various components of FIG. 1 to accomplish the above steps. For example, an XPath evaluator, such as XPath evaluator 140, may perform some or all of the above steps together with an XML parser, such as XML parser 150, in the manner discussed in section 3.3 above.

Figure 4:
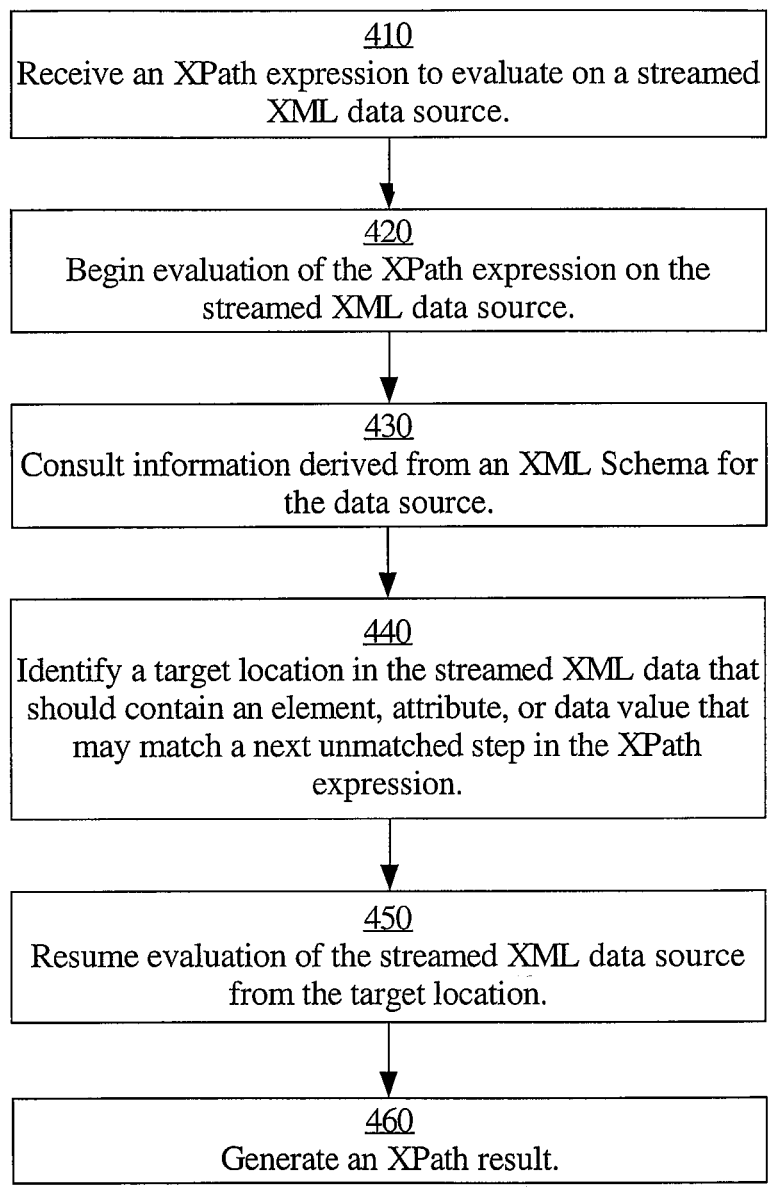
FIG. 4 depicts a flow diagram illustrating a technique for utilizing XML schema information to jump to a potentially matching portion of XML data during a streaming evaluation of an XPath expression, according to an embodiment of the invention.

4.3. Process Flow for Jumping to a Potentially Matching Portion of Streamed XML Data Based on XML Schema Information FIG. 4 depicts a flow diagram 400 illustrating a technique for utilizing XML schema information to jump to a potentially matching portion of XML data during a streaming evaluation of an XPath expression, according to an embodiment of the invention.

In step 410, a database system, such as database system 100, receives an XPath expression, such as XPath expression 110, to be evaluated with respect to a streamed XML data source, such as an XML document in data collection 130 via XML input stream 135.

In step 420, the database system begins evaluation of the XPath expression. During this evaluation, the database system may parse elements, attributes, and data values one-by-one from the streamed XML data source. When it parses an element, attribute, or data value, the database system may evaluate the element, attribute, or data value to determine if the element, attribute, or data value matches an unmatched step in the XPath expression. The database system may utilize state information or context structures to keep track of matched steps and elements. When all steps are matched, the database system may generate an XPath result based on the parsed XML data.

In step 430, while evaluating a step in the XPath expression, the database system consults information derived from an XML schema that defines the streamed XML data source, such as XML schema 160. The information consulted may include the XML schema itself, a compiled representation of the XML schema, such as compiled schema representation 165, or information coded into a compiled representation of the XPath expression. The information may be associated with the currently evaluated step or a next unmatched step. For example, the compiled representation of the XPath expression may comprise pre-determined information at each step that is based on the XML schema, as discussed in section 4.4.

In step 440, based on the information consulted in step 430, the database system identifies a target location in the streamed XML data that should contain an element, attribute, or data value that may match a next unmatched step in the XPath expression. This identification of a potentially matching portion of XML data may be accomplished in several ways.

For instance, the database system may load schema definitions for one or more matched elements (e.g. the last element that matched a step, or one of its ancestor elements). It may then compare the next unmatched step to definitions in the subtrees of the loaded schema definitions. The database system may utilize context information, such as context structures 190, to specifically exclude comparisons against definitions that only define XML data that has already been evaluated from the streamed XML data source. The database system may determine that a particular definition in the subtree may define an element, attribute, or value that matches the next unmatched step. The database system may then determine that there is no definition for an unevaluated and potentially matching element, attribute, or value that may occur before an unevaluated element, attribute, or value defined by the particular definition. The database system may then determine the target location to be at the start of the first occurrence of any unevaluated XML data corresponding to the particular subtree. Techniques for comparing the steps of an XPath expression to the XML schema to identify a potentially matching portion of XML data are discussed in section 4.5 below.

Also, the information derived from the XML schema may more directly indicate a potentially matching portion. For example, the database system may have already compiled information derived from the XML schema directly into a compiled representation of the XPath expression. During compilation, the database system may have pre-determined a potentially matching portion using much the same strategy as discussed in the previous paragraph. This pre-determined information may have been included with the currently evaluated step in the compiled XPath representation. Thus, the information consulted in step 430 may identify the target location with specific instructions that direct the database system to, in essence "jump to the nth child element of the root element," "jump to the nth sibling of the current element," and so on.

In step 450, the database system resumes evaluation of the streamed XML data source from the target location, without evaluating any interceding unevaluated XML data. As discussed under "Skipping Evaluation of Portions of XML Data" in section 3.3, this may entail ignoring events generated from the interceding unevaluated XML data, or this may entail not parsing any interceding unevaluated XML data from the streamed XML data source.

In step 460, the database system generates an XPath result based on the evaluation in steps 420-450.

The various steps of the evaluation of the streamed XML data source may be repeated any number of times, and not necessarily in the same order. For instance, steps 430-440 may be repeated after steps 450 or 460. Likewise, various steps in the process flow may be omitted depending on the nature of the streamed XML data source or the XML schema.

Process flow 400 may be combined with process flow 300. For example, after determining a non-matching portion, the database system may attempt to identify a potentially matching portion to even further optimize the streaming evaluation.

The database system may utilize various components of FIG. 1 to accomplish the above steps. For example, an XPath evaluator, such as XPath evaluator 140, may perform some or all of the above steps together with an XML parser, such as XML parser 150, in the manner discussed in section 3.3 above.

4.4. Compiling the Compiled XPath Representation Based on Schema Information

According to an embodiment, a database system may shift much of the logic for identifying non-matching portions to compile-time as opposed to evaluation-time. For some or all of the steps in an XPath expression, a database system may utilize information from XML Schema 160 to predetermine information about a non-matching portion or about a location for a next matching element. This predetermined information may be compiled into the compiled XPath representation, where it is associated with the corresponding step. During evaluation of a step comprising pre-determined information, the database system may utilize the pre-determined information to identify a non-matching portion of XML data or a location for a next potentially matching element in the XML input stream.

In some cases, a schema definition corresponding to a particular step is such that any element defined by the schema definition is guaranteed to match the particular step. If a location of an element matching the schema definition may be pre-determined, the XPath expression may be compiled so as to automatically assume that any element read from the particular location in the XML input stream matches the particular step. Furthermore, when such is the case for multiple steps in a row, the XPath expression may be compiled so as to skip steps entirely.

For example, consider the following schema, hereinafter to be known as POSchema2.

```
<?xml version="1.0" encoding="utf-8"?>
<xs:schema xmlns:xs="http://www.w3.org/2001/XMLSchema">
    <xs:element name="PurchaseOrder">
        <xs:complexType>
            <xs:sequence>
                <xs:element name="item" type="xs:int" />
```

```
            <xs:element name="date" type="xs:date" />
            <xs:element name="name" type="xs:string" />
            <xs:element name="address" type="xs:string" />
        </xs:sequence>
        </xs:complexType>
    </xs:element>
</xs:schema>
```

A database system compiling an XPath expression that targets XML data based on this schema may compile information from the schema into the compiled representation. For example, if the database system were to evaluate the XPath expression "/PurchaseOrder/name," it could include information in the compiled representation indicating that, after matching the PurchaseOrder element to the first step, the database system should jump to the third child element of PurchaseOrder in the XML input stream to find a match for the next step.

Furthermore, since the first element defined by this schema (PurchaseOrder) is guaranteed to always exist in the XML input stream, and is also guaranteed to always match the first step, the compiled representation does not actually need to compare the first parsed element to the first step. Thus, the compiled representation may indicate that the first step is "matched" simply because a first element of an XML document has been parsed from the XML input stream.

Also, since third child element of PurchaseOrder (name) is always guaranteed to exist and to match the second step, while the first and second child elements are guaranteed never to match the second step, the compiled representation does not need to represent the first step at all. In other words, the database system does not even need to evaluate the PurchaseOrder element or the name element to find a match. Instead, the compiled representation would simply contain information identifying the third child of the first element as the desired match for the XPath expression. Based on this information, at the onset of evaluation, the database system may jump directly to the third child of the first element, without having to evaluate any interceding elements.

Finally, since the POSchema2 does not define any other element that could match the second step, the compiled representation may include information indicating that after matching the name element, the database system should skip the remainder of the XML document.

According to an embodiment, a database system may also be able to determine, at compile time, that the XML schema does not permit any matches to the XPath expression. Accordingly, it may skip evaluation of the XPath expression altogether.

Figure 5:
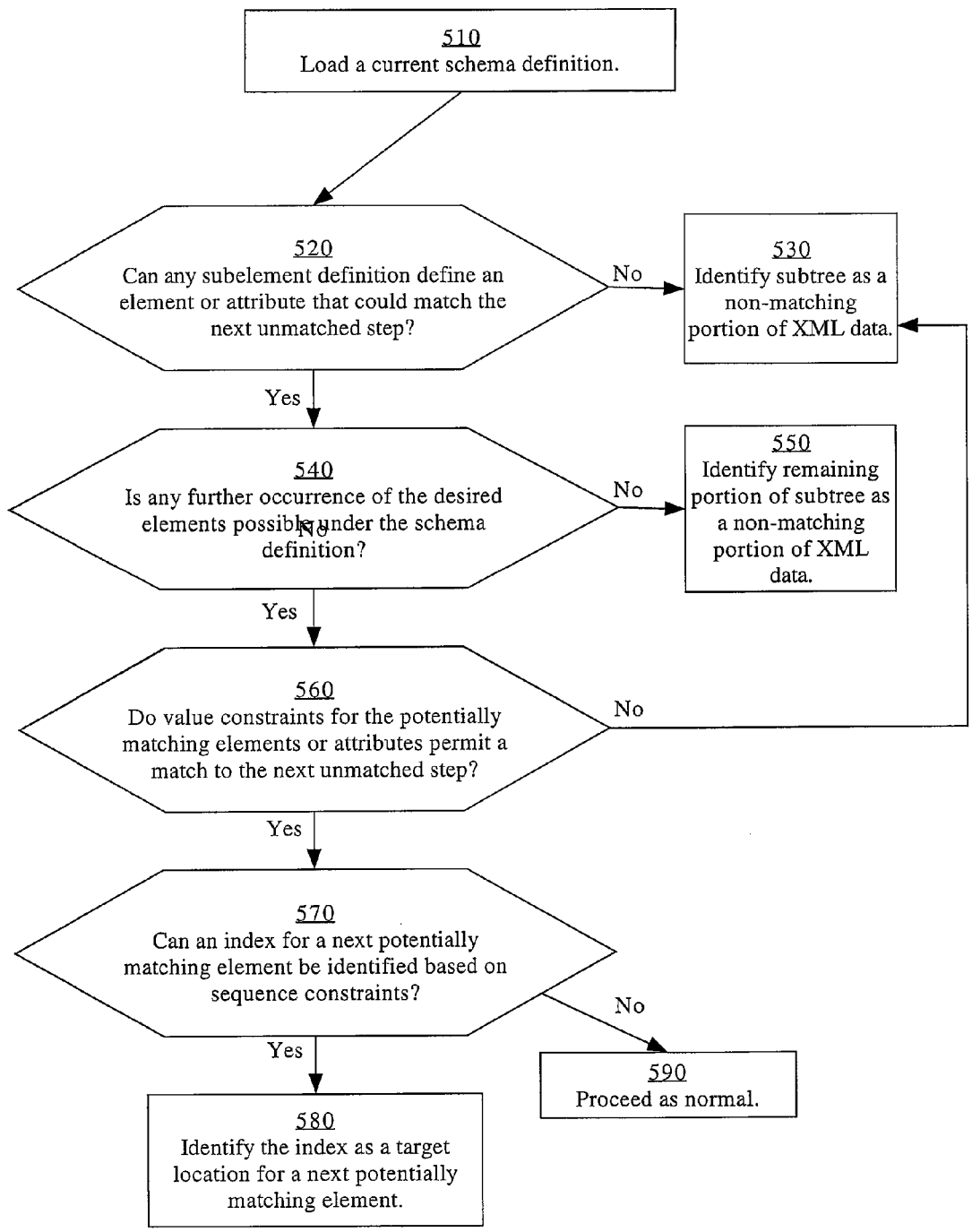
FIG. 5 is a process flow for utilizing information in an XML schema to identify portions of XML data in a streamed XML data source that either match or do not match steps in an XPath expression, according to an embodiment of the invention.

4.5. Exemplary Process Flow for Identifying a Non-Matching Portion or Potentially Matching Portion of XML Data FIG. 5 is a process flow 500 for utilizing information in an XML schema to identify portions of XML data in a streamed XML data source that either match or do not match steps in an XPath expression, according to an embodiment of the invention. Process flow 500 may be performed at the time of compilation to produce information to be included in a compiled XPath representation. Process flow 500 may also be utilized during the actual evaluation of the XPath expression.

In step 510, a database system loads a current schema definition. If process flow 500 is being performed at evaluation time, the current schema definition is for the currently evaluated element. If process flow 500 is being performed at compile time, the current schema definition is either the document root definition (if no steps of the XPath expression have been matched to schema definitions), or a schema definition that matched the last analyzed step. If more than one schema definition matched the last analyzed step, process flow 500 may be performed with respect to all schema definitions that matched the last analyzed step.

In step 520, the database system examines each subelement definition under the current schema definition. The database system may locate the subelement definitions by parsing the current schema definition, or it may utilize a child hash table from a context structure or compiled schema representation. For each subelement definition, the database system determines whether or not the subelement definition defines an element or attribute that could match the next unmatched or unanalyzed step.

If no subelement or attribute can match the next unmatched step, flow proceeds to step 530. In step 530, the database system identifies the portion of XML data defined under the current schema definition as a non-matching portion of XML data. The database system may then utilize this identification during XPath evaluation to either terminate evaluation of a data source (if the XPath step does not involve the descendant axis), or skip the non-matching portion of XML data.

However, if at least one subelement or attribute could match the next unmatched step, flow proceeds to step 540. In step 540, the database system checks occurrence constraints for potentially matching subelements and attributes under the current schema definition. The database system compares the occurrence constraints to occurrence information stored in context structures, in order to determine if any further occurrence of the desired subelement or attribute is possible at the current level in the document. For example, the current schema definition may define a certain subelement that matches the next unmatched step. However, the subelement definition may contain an occurrence constraint, such as "minOccurs=1," indicating that the subelement may only occur a certain number of times in the subtree. If, as indicated by occurrence information in context structures, the certain subelement has already appeared that certain number of times under the current subtree, the database system may safely ignore any portion of XML data under the current subtree for that occurs after the last occurrence of the certain subelement in the XML data; the XML data is guaranteed not to contain another occurrence of the potentially matching subelement.

If no further occurrence of any potentially matching subelement or attribute is possible, flow proceeds to step 550, in which the database system designates any portion of XML data under the current subtree occurring after the last occurrence of a matching subelement or attribute to be a non-matching portion of XML data The database system may then utilize this identification during XPath evaluation to either terminate evaluation of a data source (if the XPath step does not involve the descendant axis), or skip the non-matching portion of XML data.

However, if a further occurrence of a potentially matching subelement or attribute is possible, flow proceeds to step 560. In step 560, if applicable, the database system may check value constraints for each potentially matching subelement or attribute identified in step 520. For example, the next unmatched step may have a value-based predicate. This value-based predicate may be compared to type or content restrictions for the value of the subelement or attribute to see if the desired value is possible. If the value is not possible for an otherwise potentially matching subelement or attribute, the otherwise potentially matching subelement or attribute is deemed to be non-matching. If no potentially matching subelements or attributes remain after checking the value constraints, flow proceeds to step 530. Otherwise, flow proceeds to step 570.

In step 570, the database system checks sequence constraints to determine where a subelement or attribute capable of matching the next unmatched step may occur under the current schema definition. In a highly structured schema, for example, the children would occur in a sequence; hence the database system may determine the index of a potentially matching child.

In step 580, if the database system has determined such an index in step 570, the database system may identify the index as the target location in the streamed XML data source for a next portion of potentially matching XML data. The database system may then utilize this identification during XPath evaluation to jump to a potentially matching element, subelement, or value in an XML input stream.

Otherwise, in step 590, evaluation (or compilation) proceeds as normal.

The database system may utilize various components of FIG. 1 to accomplish the above steps. For example, an XPath evaluator, such as XPath evaluator 140, may perform some or all of the above steps. The database system may also perform the steps of process flow 500 in other orders. For example, it may check value constraints before occurrence constraints.

Alternative Techniques for Identifying Non-Matching Portions of XML Data

According to an embodiment, a database system may identify a non-matching portion of XML data based on any unmatched step, as opposed to just the next unmatched step. For example, an XPath evaluator may be evaluate the XPath expression "/PurchaseOrder/item/@instructions" in relation to an XML document based on the POSchema1 schema described in the "Background" section. The XPath evaluator may have just parsed the "PurchaseOrder" element. Even though POSchema defines a child element for the PurchaseOrder element, the XPath evaluator may look ahead to other future steps to determine if the subtree for PurchaseOrder can match them as well. Accordingly, the XPath evaluator may discover that there is no match for the last step of the XPath expression (i.e. there is no instruction attribute) under the subtree for PurchaseOrder. Thus the XPath evaluator may skip evaluation of the subtree for the PurchaseOrder element.

According to an embodiment, an XPath evaluator may identify a non-matching portion of XML data relative to any ancestor element, as opposed to just its parent element. For example, the database system may keep track of its state or context during compilation of a compiled XPath representation. At certain steps, the database system may load a schema definition for an ancestor to the current element or schema definition. It may then compare a next unmatched step to unevaluated portions of the ancestor definition. If no potential match is found under the ancestor, any XML data pertaining to the unevaluated portions of the ancestor may be identified as a non-matching portion. A target location for a potential match may also be identified using these means.

According to an embodiment, various other constraints in the schema may be checked. For example, the database system may further consider the implications of constraints imposed by <xs:all> or <xs:choice> tags.

5.0. Implementation Mechanism—Hardware Overview

Figure 6:
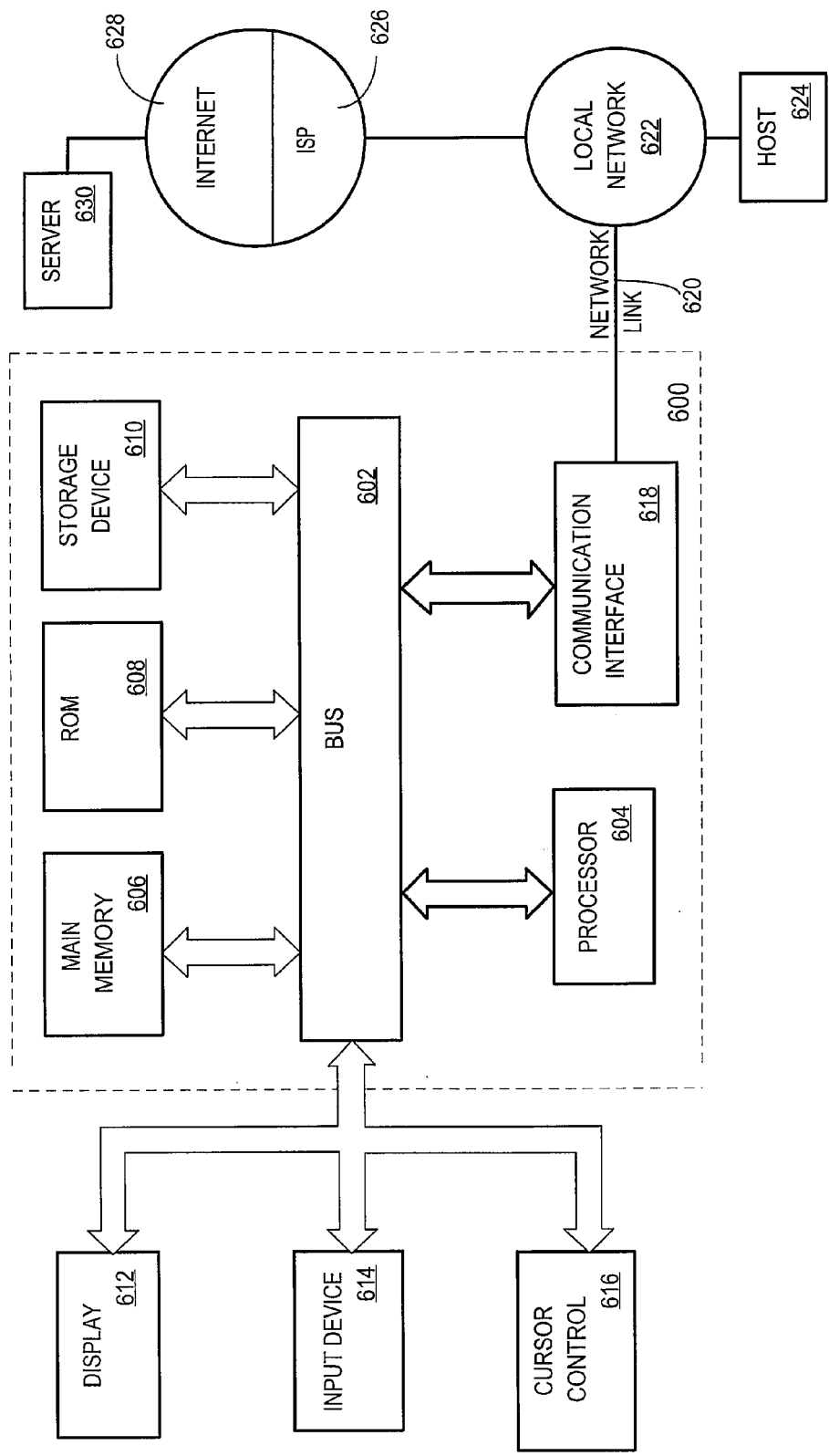
FIG. 6 is block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving a path expression to be evaluated on an encoded XML data source, wherein the encoded XML data source is defined by an XML schema, wherein the path expression comprises path expression steps, each path expression step of said path expression steps specifying at least a characteristic of an element or an element attribute, wherein the encoded XML data source comprises an encoded representation of a particular element encoded within said encoded XML data source;
prior to evaluating the encoded XML data source, compiling the path expression, thereby forming a compiled path expression,
wherein the compiled path expression comprises a representation of a path expression step of the path expression, said representation of a path expression step of the path expression including said encoded representation of a particular element;
wherein the compiled path expression also comprises a parsing instruction associated with the representation of the path expression step of the path expression;
wherein compiling the path expression comprises:
based on analyzing the XML schema, determining a portion of the encoded XML data source that cannot match the path expression step, and
generating the parsing instruction to skip said portion of the encoded XML data source;
evaluating the compiled path expression on the encoded XML data source, wherein evaluating the compiled path expression includes skipping a portion of the encoded XML data source, based on the parsing instruction, without evaluating whether said portion of the encoded XML data source matches against the path expression step; and
generating a result based on the evaluation of the path expression.

2. The method of claim 1, wherein generating the parsing instruction comprises determining that a portion of the XML schema does not define an element, attribute, or data value that could match a next path expression step.

3. The method of claim 1, wherein generating the parsing instruction comprises determining that a portion of the XML schema defines an element, attribute, or data value that potentially matches a next path expression step.

4. The method of claim 1, wherein the parsing instruction is to skip a particular number of characters or bytes in the encoded XML data source, and wherein the particular number of characters or bytes is calculated from the XML schema.

5. The method of claim 1, wherein the parsing instruction is to skip a particular number of elements in the encoded XML data source, and wherein the particular number of elements is calculated from the XML schema.

6. The method of claim 1, wherein the parsing instruction is to jump to a pointer for a particular element in the encoded XML data source, and wherein the particular element is determined from the XML schema.

7. The method of claim 1, wherein the parsing instruction is to terminate evaluation of the encoded XML data source.

8. The method of claim 1, wherein evaluating the compiled path expression comprises sending the parsing instruction to an XML parser.

9. The method of claim 1, wherein the path expression comprises a second path expression step, wherein compiling the path expression comprises determining, based on the XML Schema, not to specify the second path expression step in the compiled path expression.

10. The method of claim 1, wherein the path expression step indicates that it is to be matched to an element of a particular name, and wherein the compiled representation of the path expression step does not include information indicating any name.

11. The method of claim 1, wherein the compiled path expression is a state machine.

12. One or more non-transitory computer-readable storage media storing instructions that, when executed by one or more computing devices, causes:
  receiving a path expression to be evaluated on an encoded XML data source, wherein the encoded XML data source is defined by an XML schema, wherein the path expression comprises path expression steps, each path expression step of said path expression steps specifying at least a characteristic of an element or an element attribute; wherein the encoded XML data source comprises an encoded representation of a particular element encoded within said encoded XML data source;
  prior to evaluating the encoded XML data source, compiling the path expression, thereby forming a compiled path expression,
    wherein the compiled path expression comprises a representation of a path expression step of the path expression, said representation of a path expression step of the path expression including said encoded representation of a particular element;
    wherein the compiled path expression also comprises a parsing instruction associated with the representation of the path expression step of the path expression;
    wherein compiling the path expression comprises:
      based on analyzing the XML schema, determining a portion of the encoded XML data source that cannot match the path expression step, and
      generating the parsing instruction to skip said portion of the encoded XML data source;
  evaluating the compiled path expression on the encoded XML data source, wherein evaluating the compiled path expression includes skipping a portion of the encoded XML data source, based on the parsing instruction, without evaluating whether said portion of the encoded XML data source matches against the path expression step; and
  generating a result based on the evaluation of the path expression.

13. The one or more computer readable storage media of claim 12, wherein generating the parsing instruction comprises determining that a portion of the XML schema does not define an element, attribute, or data value that could match a next path expression step.

14. The one or more computer readable storage media of claim 12, wherein generating the parsing instruction comprises determining that a portion of the XML schema defines an element, attribute, or data value that potentially matches a next path expression step.

15. The one or more computer readable storage media of claim 12, wherein the parsing instruction is to skip a particular number of characters or bytes in the encoded XML data source, and wherein the instructions further include instructions that, when executed by said one or more computing devices, cause calculating the particular number of characters or bytes from the XML schema.

16. The one or more computer readable storage media of claim 12, wherein the parsing instruction is to skip a particular number of elements in the encoded XML data source, and wherein the instructions further include instructions that, when executed by said one or more computing devices, cause calculating the particular number of elements from the XML schema.

17. The one or more computer readable storage media of claim 12, wherein the parsing instruction is to jump to a pointer for a particular element in the encoded XML, data source, and wherein the instructions further include instructions that, when executed by said one or more computing devices, cause determining the particular element from the XML schema.

18. The one or more computer readable storage media of claim 12, wherein the parsing instruction is to terminate evaluation of the encoded XML data source.

19. The one or more computer readable storage media of claim 12, wherein evaluating the compiled path expression comprises sending the parsing instruction to an XML parser.

20. The one or more computer readable storage media of claim 12, wherein the path expression comprises a second path expression step, wherein compiling the path expression comprises determining, based on the XML Schema, not to specify the second path expression step in the compiled path expression.

21. The one or more computer readable storage media of claim 12, wherein compiling the path expression further comprises generating a compiled representation of a path expression step from the path expression, and wherein the compiled representation is different than the path expression step.

22. The one or more computer readable storage media of claim 12, wherein the compiled path expression is a state machine.

23. The one or more computer readable storage media of claim 21, wherein the path expression step indicates that it is to be matched to an element of a particular name, and wherein the compiled representation of the path expression step does not include information indicating any name.

24. The one or more computer readable storage media of claim 12 wherein the encoded XML data source is an encoded XML data source, and wherein compiling the path expression comprises encoding the path expression using a same encoding scheme as was used to encode the XML data source.

25. The one or more computer readable storage media of claim 21, wherein the compiled representation includes at least a portion of the XML Schema.

26. The one or more computer readable storage media of claim 12, wherein the parsing instruction specifies a portion of the XML data source that is not to be parsed.

* * * * *

UNITED STATES PATENT AND TRADEMARK OFFICE
CERTIFICATE OF CORRECTION

| | | |
|---|---|---|
| PATENT NO. | : 9,842,090 B2 | |
| APPLICATION NO. | : 11/950642 | |
| DATED | : December 12, 2017 | |
| INVENTOR(S) | : Idicula et al. | |

It is certified that error appears in the above-identified patent and that said Letters Patent is hereby corrected as shown below:

On the Title Page

On page 3, Column 1, under Other Publications, Line 45, delete "Pulished" and insert -- Published --, therefor.

In the Specification

In Column 12, Line 60, delete "f Portions" and insert -- of Portions --, therefor.

In the Claims

In Column 26, Line 23, in Claim 17, delete "XML," and insert -- XML --, therefor.

Signed and Sealed this
Tenth Day of July, 2018

Andrei Iancu
*Director of the United States Patent and Trademark Office*